March 30, 1943.　　　O. E. HOLLE　　　2,315,204
PLANTER
Filed March 12, 1941

Otto E. Holle
INVENTOR.

BY
ATTORNEY.

Patented Mar. 30, 1943

2,315,204

UNITED STATES PATENT OFFICE 2,315,204

PLANTER

Otto E. Holle, Decatur, Ind.

Application March 12, 1941, Serial No. 382,975

3 Claims. (Cl. 111—86)

The invention relates to seed planters and particularly to the shoes and shanks thereof. In the planting of beets, beans and corn, fertilizer is usually deposited in the furrow at the time that the seed is deposited. Best results are attained by depositing the fertilizer below the seed so that the fertilizer will be effective on the roots. The seed should not contact the fertilizer hence it is necessary that sufficient soil shall cover the fertilizer before the seed is deposited.

The object of my invention is to provide a planter with novel means by which a furrow is formed, fertilizer is deposited in the furrow, a maximum of soil is released to cover the fertilizer and finally seed is deposited on the covering.

In accomplishing the invention, I form a shoe with a cutting blade, having a laterally expanded portion to form a channel for the passage of fertilizer which opens rearwardly. The shoe immediately behind the fertilizer discharge opening is sharply constricted laterally for a selected distance and then expanded laterally to the rear end to form a seed conduit, the shank having passages for both the fertilizer and the seed.

The invention is illustrated in the accompanying drawing in which

Figure 1:
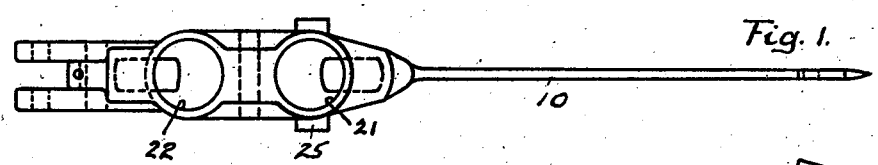
Figure 1 is a plan view of a shoe and shank embodying the invention.
Figure 2:
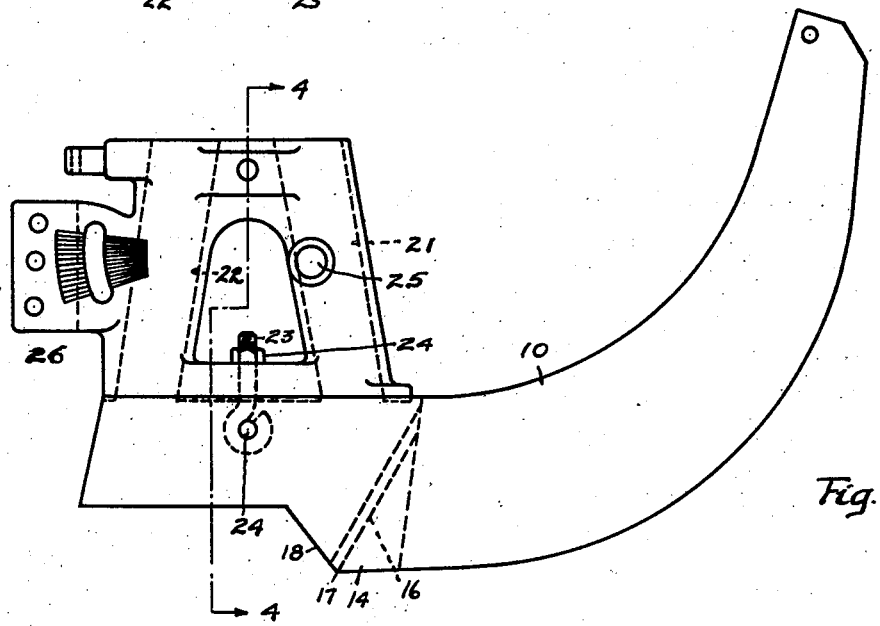
Figure 2 is a side elevation of the same.
Figure 3:
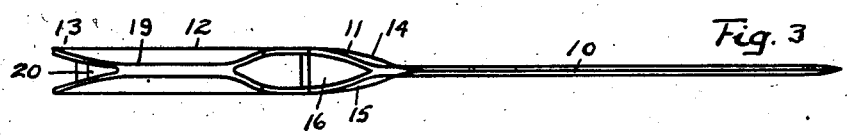
Figure 3 is a bottom plan view of the shoe.
Figure 4:
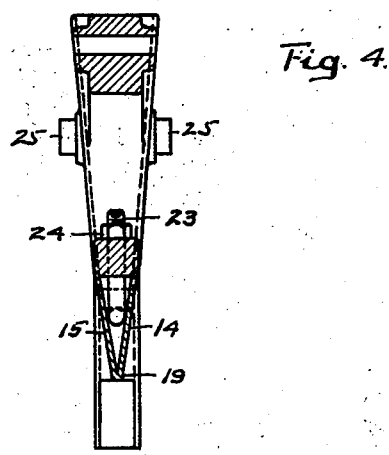
Figure 4 is a cross-section on line 4—4 of Fig. 2.

Referring to the illustrative embodiment of the invention, the shoe consists of the blade 10, the laterally expanded section 11, the constricted section 12 and the expanded section 13. The bifurcations or walls 14, 15 form the expanded section 11, and a shelf 16 leads from the upper forward end of the section to the lower edge of each wall at the corners 17 thereof formed by cutting away the lower portion of said walls. Fertilizer is fed onto the shelf and it drops off the shelf into the furrow formed by the blade. Rearwardly of the edges 18 the walls are contacted in at least their lower portions for a selected distance as shown at 19 and they are then separated again to form a passage 20 for the seed. The upper edges of the walls 14, 15 are substantially parallel and uniformly spaced, and in their constricted section the walls form a V. This latter section releases a maximum quantity of the soil that has been distributed by the blade so that it is free to drop onto the fertilizer that has been deposited in the bottom of the furrow.

The shank is formed with two passageways 21 and 22, for fertilizer and seed respectively. The bottom of the shank is reduced to seat within the side walls 14, 15, and a hook shaped bolt 23 engages a pin 24 fixed in the walls 14, 15 and projects through an opening in the bottom of the shank, a nut 24 serving to secure the parts together. The usual pressure wheel (not shown) that follows the shoe is pivotally mounted on the lugs 25 and adjustably secured to the corrugated section 26.

Receptacles for fertilizer and seed are suitably connected to the passages 21, 22 respectively and the usual mechanisms to control the connections are used. Such are not shown as they form no part of my invention.

The length of the shoe and of the constricted section may be varied in accordance with the seed to be planted, the form shown being particularly well adapted for planting sugar beets and soy beans.

The relative narrowness of the shoe reduces the lateral pressure exerted on the soil as the furrow is formed so that the soil is more apt to fall freely into the furrow than where the shoe is so wide that it presses the soil forcibly laterally.

What I claim is:

1. In a planter, a shoe comprising a blade having a bifurcated rear portion, a rearwardly opening discharge conduit for fertilizer in the forward portion of the bifurcation and a conduit for the discharge of seed adjacent to the rear end of the bifurcations, the said bifurcations being cut away in their lower portions from the discharge end of the fertilizer conduit to their rear ends and being in contact in a selected area between said conduits and a shank secured to said bifurcations and having passageways therein communicating with said conduits for feeding fertilizer and seed thereto respectively.

2. In a planter, a shoe comprising a blade having two laterally spaced side walls in its rear portion, a rearwardly opening discharge conduit for fertilizer between said walls, a discharge conduit for seed between the walls adjacent to their rear ends, said walls being cut away in their lower portions from the discharge end of the fertilizer conduit to their rear ends and being in contact for a portion of their length between said conduits and a shank secured to said bifurcations and having passageways therein communicating with said conduits for feeding fertilizer and seed thereto respectively.

3. A planter shoe consisting of a blade having two laterally spaced walls in its rear portion the upper edges of which are substantially parallel the greater part of their length, said walls being cut away in their lower portions from a selected point to their rear ends, means in the forward end of the space between said walls to form a rearwardly declined conduit for fertilizer having its discharge end at the forward end of the cut away portion of said walls and a conduit for seed adjacent to the rear ends of the walls and for a selected distance between said conduits said walls sloping vertically downwardly toward each other and being substantially in contact along their lower edges.

OTTO E. HOLLE.